United States Patent
Yasaki et al.

(10) Patent No.: US 9,058,405 B2
(45) Date of Patent: Jun. 16, 2015

(54) PLAYBACK APPARATUS AND PLAYBACK METHOD

(71) Applicant: FUJITSU LIMITED, Kawasaki-shi, Kanagawa (JP)

(72) Inventors: Koichi Yasaki, Kawasaki (JP); Zhaogong Guo, Koto (JP); Isamu Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 13/652,744

(22) Filed: Oct. 16, 2012

(65) Prior Publication Data
US 2013/0174153 A1    Jul. 4, 2013

(30) Foreign Application Priority Data

Dec. 28, 2011    (JP) ................................ 2011-287952

(51) Int. Cl.
| | |
|---|---|
| *G06F 9/455* | (2006.01) |
| *G06F 3/00* | (2006.01) |
| *G05B 19/42* | (2006.01) |
| *H04N 5/932* | (2006.01) |
| *G06F 17/30* | (2006.01) |

(52) U.S. Cl.
CPC ................................ *G06F 17/30905* (2013.01)

(58) Field of Classification Search
None
See application file for complete search history.

(56) References Cited

U.S. PATENT DOCUMENTS

| | | | |
|---|---|---|---|
| 2007/0140653 A1* | 6/2007 | Kozuka et al. .................. 386/95 |
| 2007/0213135 A1* | 9/2007 | Aida ............................... 463/42 |
| 2007/0225076 A1* | 9/2007 | Aida ............................... 463/42 |
| 2007/0298773 A1 | 12/2007 | Uematsu et al. |
| 2010/0034518 A1* | 2/2010 | Iwamoto et al. ................ 386/95 |
| 2010/0107158 A1* | 4/2010 | Chen et al. ....................... 718/1 |
| 2010/0281403 A1 | 11/2010 | Yamakami et al. |
| 2011/0211808 A1* | 9/2011 | Ryu ............................. 386/234 |
| 2011/0258623 A1* | 10/2011 | Wagner et al. ..................... 718/1 |
| 2012/0102135 A1* | 4/2012 | Srinivasan et al. ............ 709/213 |
| 2012/0284380 A1* | 11/2012 | Anderson et al. ............. 709/223 |
| 2013/0275808 A1* | 10/2013 | McNeeney et al. ............. 714/20 |

FOREIGN PATENT DOCUMENTS

| | | |
|---|---|---|
| JP | 4712722 | 4/2011 |
| WO | WO2009/084591 A1 | 7/2009 |

\* cited by examiner

*Primary Examiner* — Adam Lee
(74) *Attorney, Agent, or Firm* — Staas & Halsey LLP (57) ABSTRACT

A playback apparatus includes a storage unit and a processor. The storage unit stores therein, for each of a plurality of playback environments, information indicating suitability for playback of a content in association with an identifier of the content. The processor receives a content via a network. The processor selects a playback environment based on an identifier of the received content and the information stored in the storage unit. The processor starts a first virtual machine that includes the selected playback environment. The first virtual machine is one of a plurality of virtual machines each including a playback environment. The playback environments included in the plurality of virtual machines are different from one another. The processor requests the first virtual machine to play back the received content.

15 Claims, 8 Drawing Sheets

138

| | <PLAYBACK ENVIRONMENT A> | | <PLAYBACK ENVIRONMENT B> | | <PLAYBACK ENVIRONMENT C> | |
|---|---|---|---|---|---|---|
| | RECOMMENDED | RESULT | RECOMMENDED | RESULT | RECOMMENDED | RESULT |
| <URL1> | 1 | SUCCESS | 2 | ERROR | | |
| <URL2> | | ERROR | 1 | SUCCESS | | |
| ⋮ | ⋮ | ⋮ | ⋮ | ⋮ | ⋮ | ⋮ |

PLAYBACK APPARATUS AND PLAYBACK METHOD

CROSS-REFERENCE TO RELATED APPLICATION

This application is based upon and claims the benefit of priority of the prior Japanese Patent Application No. 2011-287952, filed on Dec. 28, 2011, the entire contents of which are incorporated herein by reference.

FIELD

The embodiments discussed herein are related to a playback apparatus and a playback method.

BACKGROUND

Various terminal devices including personal computers (PCs), mobile phones, smartphones, and tablet devices are currently capable of accessing contents provided via the Internet. However, each of the contents is not necessarily capable of being played back in the same manner on all the terminal devices. In addition, the contents may be played back in different manners even in the same terminal device depending on the kinds of Web browsers that are used, plug-ins that are installed, or the like. This is because contents exist, which include an incompatible portion depending on specific terminal devices or specific Web browsers.

In the above incompatible situation, playback of contents has been hitherto devised, for example, in the following methods.

In a first method, a content providing side acquires information about a terminal device of a requester for a content and provides the content in a format appropriate for the terminal device. For example, the content providing side prepares contents matched with decoders or resolutions of respective terminal devices. Alternatively, the content providing side generates contents corresponding to respective terminal devices, for example, HyperText Markup Language (HTML) contents for PCs, HTML contents for mobile phones, and the like.

In a second method, a content providing side sets, in the content, parameters to cause a terminal device to perform a behavior appropriate for the content. The terminal device, for example, displays or plays back the content in accordance with the parameters. For example, on a Web site of a bank, a keyword "Strict-Transport-Security: max-age=15768000" is included in the content to vary the behavior of a Web browser in order to play back the content in Secure Socket Layer (SSL) communication. In a content described in HTML5, playback with a Chrome engine is instructed with a keyword "meta http-equiv="X-UA-Compatible" content="chrome=1".

Japanese Patent No. 4712722 and International Publication Pamphlet No. WO 2009/084591 disclose related technologies.

However, contents are prepared for multiple kinds of terminal devices in the first method. Accordingly, it is difficult to adopt the first method if the content providing side does not have a size sufficient for the preparation of the multiple kinds of contents. In addition, some contents include a code that normally operates only on specific operating systems (OSs) or specific Web browsers and any conversion method for the code is not established. It is difficult for such a content to be played back in the same manner on various terminal devices.

In order to allow a user of the terminal device to comfortably browse a content by the second method, there is a problem in that the user makes the time and effort to select a Web browser or an OS in accordance with the content.

SUMMARY

According to an aspect of the present invention, provided is a playback apparatus including a storage unit and a processor. The storage unit stores therein, for each of a plurality of playback environments, information indicating suitability for playback of a content in association with an identifier of the content. The processor receives a content via a network. The processor selects a playback environment based on an identifier of the received content and the information stored in the storage unit. The processor starts a first virtual machine that includes the selected playback environment. The first virtual machine is one of a plurality of virtual machines each including a playback environment. The playback environments included in the plurality of virtual machines are different from one another. The processor requests the first virtual machine to play back the received content.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
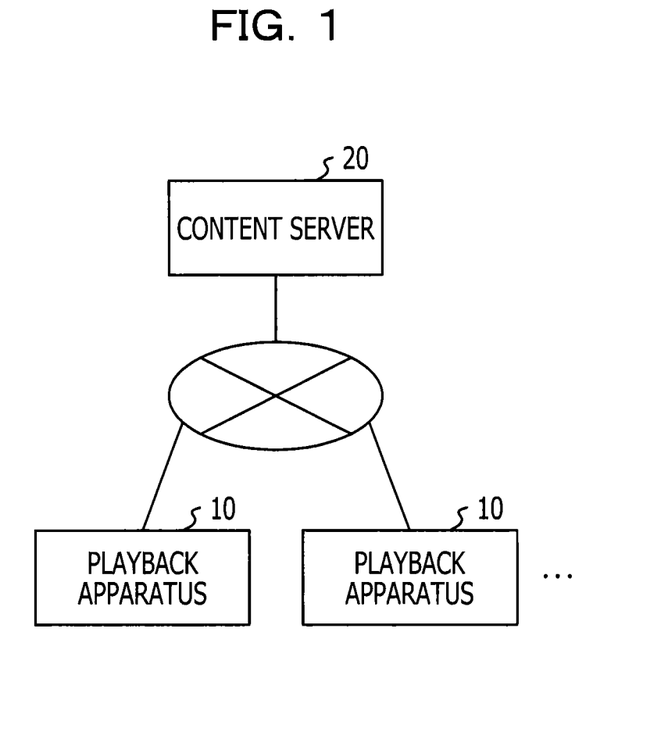
FIG. 1 illustrates an example of a configuration of a system according to an embodiment.

Embodiments will herein be described with reference to the attached drawings. FIG. 1 illustrates an example of a configuration of a system according to an embodiment. Referring to FIG. 1, a content server 20 is capable of communicating with one or more playback apparatuses 10 over a network, such as a local area network (LAN) or the Internet. Radio communication may be used for part of the network or the entire network.

The content server 20 is a computer that provides contents over the network. One example of the content server 20 is a Web server. HyperText Markup Language (HTML) contents and various contents incorporated in the HTML contents are exemplified as the contents in the present embodiment. However, the present embodiment may be applied to contents of other data formats.

The playback apparatus 10 is an information processing apparatus having a function to play back contents. Examples of the playback apparatus 10 include a PC, a tablet device, a smartphone, and a mobile phone.

Figure 2:
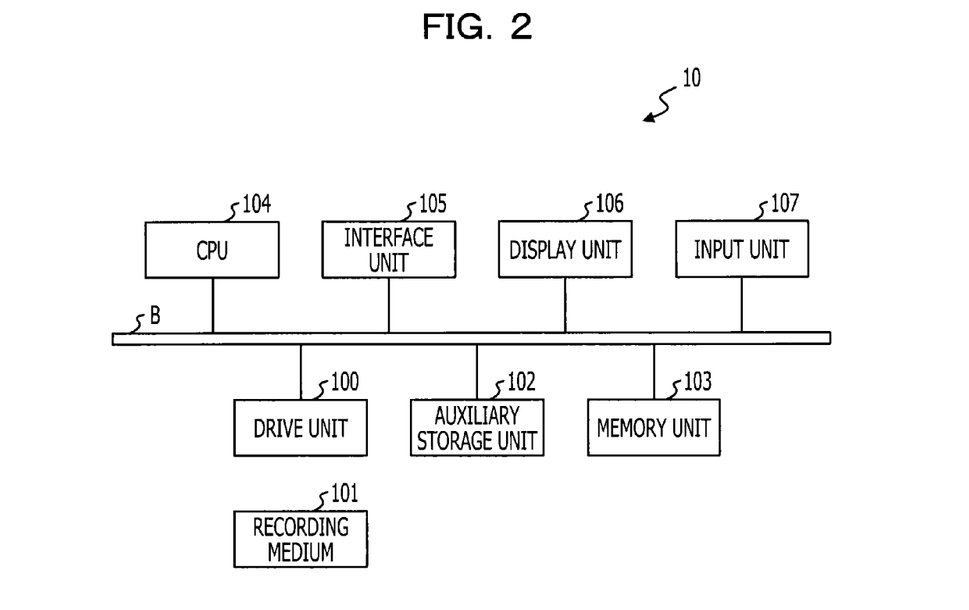
FIG. 2 illustrates an example of a hardware configuration of a playback apparatus according to an embodiment.

FIG. 2 illustrates an example of a hardware configuration of a playback apparatus according to an embodiment. The playback apparatus 10 in FIG. 2 includes, for example, a drive unit 100, an auxiliary storage unit 102, a memory unit 103, a central processing unit (CPU) 104, an interface unit 105, a display unit 106, and an input unit 107 that are connected to each other via a bus B.

Programs realizing the processing in the playback apparatus 10 are provided from a recording medium 101. Loading the recording medium 101 in the drive unit 100 causes the programs stored in the recording medium 101 to be installed in the auxiliary storage unit 102 from the recording medium 101 via the drive unit 100. However, the programs are not necessarily installed from the recording medium 101 and may be downloaded from another computer via the network. The auxiliary storage unit 102 stores files, data, etc., in addition to the installed programs.

When an instruction to start a program is issued, the program is read out from the auxiliary storage unit 102 and stored in the memory unit 103. The CPU 104 realizes a function concerning the playback apparatus 10 in accordance with the program stored in the memory unit 103. The interface unit 105 is used as an interface to connect the playback apparatus 10 to the network. The display unit 106 displays, for example, a graphical user interface (GUI) specified in the program. The input unit 107 includes a keyboard, a mouse, buttons, or a touch panel and is used to accept various operation instructions that are input.

The recording medium 101 is exemplified by a portable recording medium, such as a compact disk-read only memory (CD-ROM), a digital versatile disk (DVD), or a universal serial bus (USB) memory. The auxiliary storage unit 102 is exemplified by a hard disk drive (HDD) or a flash memory. Both of the recording medium 101 and the auxiliary storage unit 102 correspond to computer-readable recording media.

Figure 3:
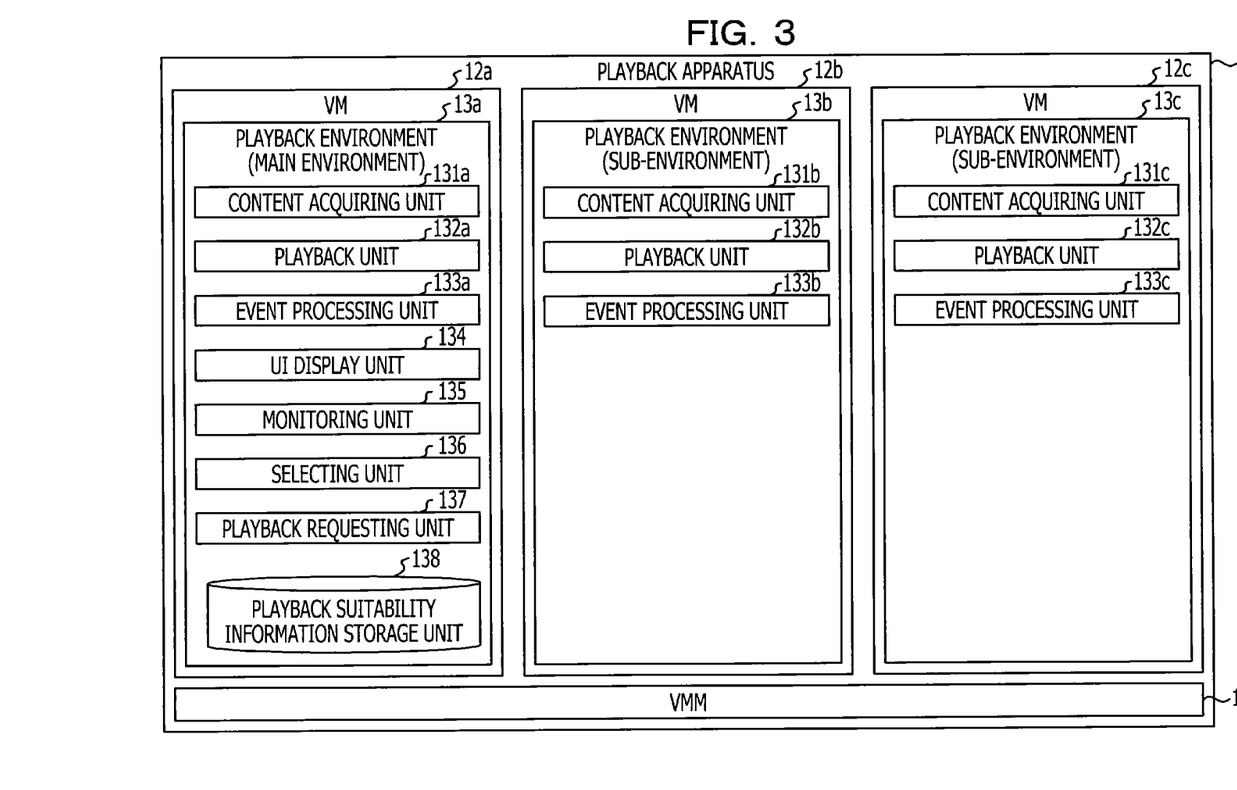
FIG. 3 illustrates an example of a functional configuration of a playback apparatus according to an embodiment.

FIG. 3 illustrates an example of a functional configuration of a playback apparatus according to an embodiment. Referring to FIG. 3, the playback apparatus 10 includes a virtual machine monitor (VMM) 11 and multiple virtual machines (VMs) 12 including a VM 12a, a VM 12b, and a VM 12c.

The VMM 11 is also called a hypervisor and realized by executing software. The VMM 11 virtualizes a computer and causes multiple OSs to be executed in parallel. The VMM 11 causes a virtual machine to operate and execute an OS on the virtual machine. The virtual machine is a virtual computer realized by executing software The VMs 12 each include a playback environment 13. Referring to FIG. 3, a playback environment 13a, a playback environment 13b, and a playback environment 13c are included in the VM 12a, the VM 12b, and the VM 12c, respectively. The playback environment 13 is realized by executing software and plays back a content provided over the network. The playback environment 13 is mainly characterized by a combination of, for example, the OS and a rendering engine. In other words, each playback environment 13 is distinguished by a combination of the kind of the OS and the kind of the rendering engine. In the present embodiment, the VMs 12 include different playback environments 13. In other words, at least one of the OS and the rendering engine corresponding to each playback environment 13 is different from that in the other playback environments 13. The rendering engine is, for example, a program module that composes part of a Web browser and performs rendering (that is, playback) of contents.

Because of being different from each other in the kind of the OS or the rendering engine, the playback environments 13 may be different from each other in whether an extended portion of an HTML content may be played back or in playback modes of the extended portion of the HTML content. The extended portion of an HTML content is a portion that is extended in accordance with specifications specific to an OS or a rendering engine. For example, a playback environment 13 corresponding to the Windows (registered trademark) OS and the Internet Explorer rendering engine, may execute ActiveX. In contrast, a playback environment 13 corresponding to the Android OS and the Webkit engine as the rendering engine, does not execute ActiveX.

Each playback environment 13 includes, for example, a content acquiring unit 131, a playback unit 132, and an event processing unit 133. Specifically, the playback environment 13a includes a content acquiring unit 131a, a playback unit 132a, and an event processing unit 133a. The playback environment 13b includes a content acquiring unit 131b, a playback unit 132b, and an event processing unit 133b. The playback environment 13c includes a content acquiring unit 131c, a playback unit 132c, and an event processing unit 133c. These units are realized by the processing which a program installed in each VM 12 in the playback apparatus 10 causes the CPU 104 to perform.

The content acquiring unit 131 downloads an HTML content from the content server 20. The playback unit 132 functions as the rendering engine. Specifically, the playback unit 132 plays back the HTML content downloaded by the content acquiring unit 131. The playback units 132 in the respective playback environments 13 may be different from each other in whether the extended portion of an HTML content may be played back. The event processing unit 133 performs the processing corresponding to an input event for the HTML content that is played back.

In the present embodiment, the "playback" includes not only playback of a sound and a motion picture but also drawing of a still image. In other words, in the present embodiment, the "playback" means making information recorded in electronic data serving as the HTML content recognizable by five senses of human beings, particularly, by the sense of sight or the sense of hearing thereof.

In the present embodiment, the playback environment 13a functions as a main environment. The playback environment 13a is hereinafter also referred to as a "main environment 13a". Each playback environment 13 other than the main environment 13a is referred to as a "sub-environment".

The playback environment 13a as the main environment further includes a user interface (UI) display unit 134, a monitoring unit 135, a selecting unit 136, a playback requesting unit 137, and a playback suitability information storage unit 138. The UI display unit 134, the monitoring unit 135, the selecting unit 136, and the playback requesting unit 137 are realized by the processing which a program installed in the VM 12a causes the CPU 104 to perform. The playback suitability information storage unit 138 may be realized by, for example, using the auxiliary storage unit 102.

The UI display unit 134 displays a browsing screen of the HTML content in the display unit 106. The browsing screen may include a display portion where an operation instruction with a menu, a button, etc. is accepted, in addition to a playback area of the HTML content, as in common Web browser screens. The menu may include a bookmark.

The monitoring unit 135 monitors the communication with the content server 20 by the content acquiring unit 131 in the each playback environment 13. For example, the VMM 11 is set so that, in each VM 12 other than the VM 12a, the destination to which a virtual LAN is connected is set to the VM 12a and the communication between the playback apparatus 10 and an external apparatus is established via the VM 12a. This causes the communication between each VM 12 and an external apparatus to be established via the VM 12a. Accordingly, the monitoring unit 135 is capable of monitoring the communication via the VM 12a to monitor the communication by the content acquiring unit 131 in the playback environment 13 of each VM 12.

The selecting unit 136 selects the playback environment 13 estimated to be appropriate for playback of an HTML content downloaded from the content server 20 by the content acquiring unit 131 in the main environment 13a or the sub-environment. Information stored in the playback suitability information storage unit 138 is used in the selection. The playback suitability information storage unit 138 stores information indicating the suitability for playback, for each playback environment 13 and for each Uniform Resource Locator (URL), which is an example of an identifier of the HTML content. The playback requesting unit 137 requests the playback environment 13, which is selected by the selecting unit 136, to play back the HTML content.

As apparent from the description of the selecting unit 136 and the playback requesting unit 137, a logical parent-child relationship or a hierarchical relationship concerning playback of HTML contents is built between the main environment 13a and the sub-environments.

Figure 4:
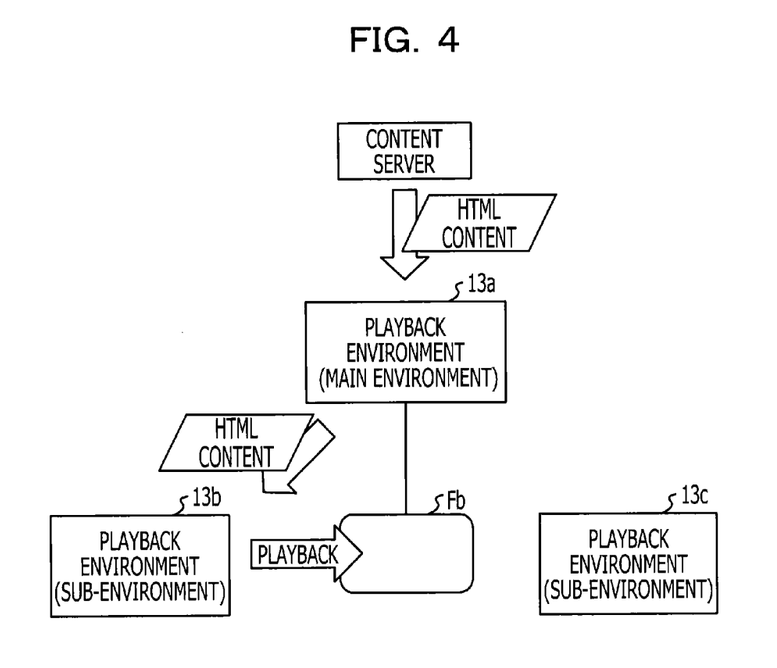
FIG. 4 illustrates a parent-child relationship between playback environments.

FIG. 4 illustrates the parent-child relationship between the playback environments. Referring to FIG. 4, arrows indicate a flow of an HTML content. In the main environment 13a, a playback environment 13 estimated to be appropriate for playback of an HTML content downloaded from the content server 20 is selected. The main environment 13a requests the selected playback environment 13 to play back the HTML content. To be precise, the request for playback is transmitted, via the VMM 11, to the playback environment 13 selected by the main environment 13a.

FIG. 4 illustrates an example in which the main environment 13a requests the playback environment 13b to play back the HTML content. The playback environment 13b is also notified of an address, etc. of a frame buffer Fb managed by the main environment 13a, in addition to the HTML content. The frame buffer Fb is a memory area in which playback information for the playback area on the browsing screen displayed by the main environment 13a is stored. The frame buffer Fb is realized by, for example, the memory unit 103. Although the frame buffer Fb corresponding to one screen is illustrated in FIG. 4, a frame buffer for a screen displayed in accordance with a program embedded in the HTML content may be ensured, for example. In this case, the playback environment 13b is notified of the address of this frame buffer, too.

The playback environment 13b records the result of the playback of the HTML content in the frame buffer Fb. In other words, the content of drawing indicated by the HTML content is drawn in the frame buffer Fb. As a result, the content of drawing indicated by the HTML content is displayed in the playback area on the browsing screen.

In contrast, the VM 12c including a playback environment 13c that is not selected as the playback destination enters a sleep state. The VM 12 in the sub-environment that is not the playback destination is caused to be in the sleep state in order to reduce the load on the CPU 104. However, when the playback apparatus 10 includes multiple CPUs 104 and the CPUs 104 are allocated to the respective VMs 12, the sub-environment that is not selected as the playback destination may not necessarily be set to the sleep state.

The main environment 13a may be selected as the playback destination. In this case, the HTML content is played back in the main environment 13a.

Procedures performed by the playback apparatus 10 will be described. A procedure performed in the playback environment 13 requested to play back an HTML content by the main environment will now be described.

Figure 5:
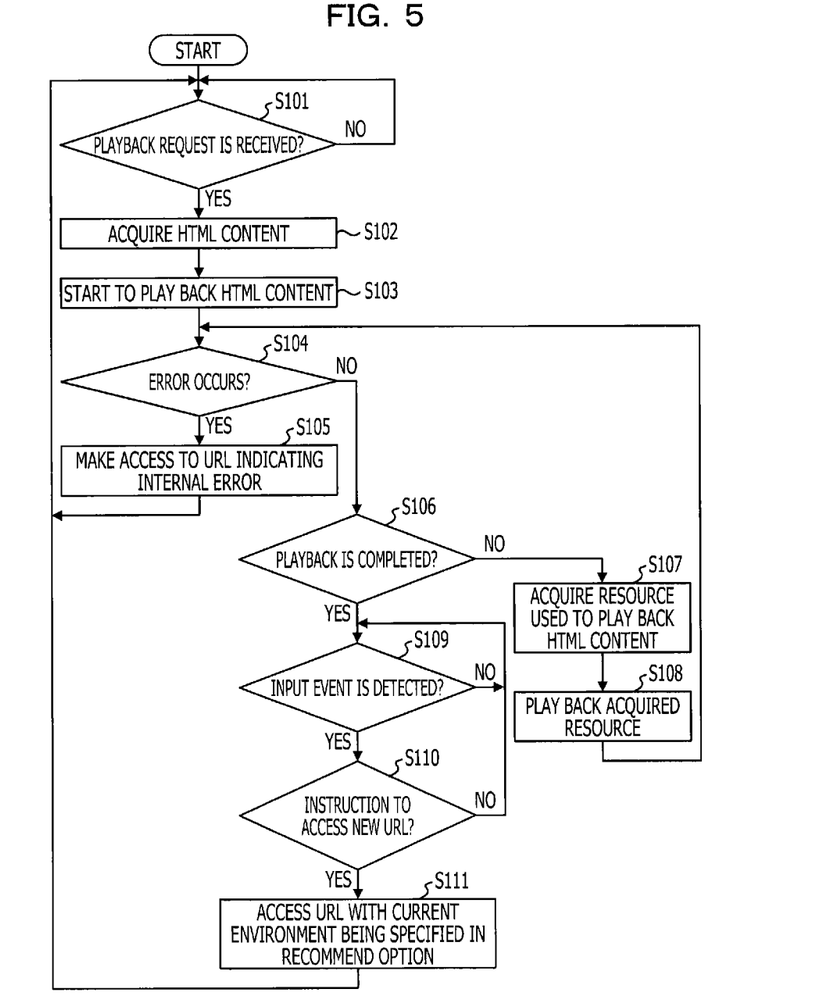
FIG. 5 is a flow chart illustrating an example of a procedure performed in a playback environment in which an HTML content is requested to be played back.

FIG. 5 is a flow chart illustrating an example of a procedure performed in the playback environment requested to play back the HTML content. The playback environment 13 to which a playback request is submitted is hereinafter referred to as a "current playback environment 13". For example, in the example in FIG. 4, the playback environment 13b corresponds to the current playback environment 13.

In S101, it is determined whether the current playback environment 13 receives a request to play back an HTML content from the VMM 11.

In S102, when the current playback environment 13 receives a request to play back an HTML content from the VMM 11 (Yes in S101), the content acquiring unit 131 in the current playback environment 13 acquires the HTML content specified in the playback request.

In S103, the playback unit 132 in the current playback environment 13 starts to play back the acquired HTML content. Specifically, the playback unit 132 interprets the content of definition in the HTML content and records, in the frame buffer Fb, raster data indicating the content of drawing corresponding to the content of definition.

In S104, it is determined whether an error, that is, a problem occurs during the playback.

In S105, when an error occurs during the playback (Yes in S104), the playback unit 132 makes an access to a URL indicating the occurrence of the error. Specifically, the playback unit 132 transmits a HyperText Transfer Protocol (HTTP) request to the URL indicating the occurrence of the error. The URL indicating an occurrence of an error is hereinafter referred to as an "error URL".

It is assumed in the present embodiment that the error URL is "http://127.0.0.1/error". In other words, the error URL results from addition of a character string "error" to a loopback address. As described below, the error URL is to notify the main environment 13a of a failure in playback of the HTML content. Accordingly, the content of the error URL is not limited as long as the error URL may be used to identify the failure in playback of the HTML content.

In S106, when no error occurs during the playback of the HTML content (No in S104), the playback unit 132 in the current playback environment 13 determines whether the playback is completed.

In S107, when the playback is not completed (No in S106), the playback unit 132 acquires a resource used to play back the HTML content from the content server 20. The resource used to play back the HTML content means a resource, such as an image file, a motion picture file, or an audio file, which is referred to by the HTML content and which may compose the HTML content.

In S108, the playback unit 132 plays back the acquired resource.

S107 and S108 are performed for each resource referred to by the HTML content. When an error occurs during the playback of any resource (Yes in S104), the playback unit 132 makes an access to the error URL, in S105.

When the playback of each resource is completed to complete the playback of the HTML content (Yes in S106), the result of the playback recorded in the frame buffer Fb is displayed in the playback area on the browsing screen. The display of the result of the playback may be sequentially performed with the advance of the recording in the frame buffer Fb. After the playback of the HTML content is completed, the process goes to S109.

In S109, it is determined whether an input event in the playback area on the browsing screen is detected.

In S110, when an input event in the playback area on the browsing screen is detected (Yes in S109), the event processing unit 133 in the current playback environment 13 determines whether the input event is an instruction to access a new URL. Specifically, the event processing unit 133 determines whether the input event is an instruction to perform access to another URL, such as clicking or touch of a link to another URL.

When the input event is not an instruction to access a new URL (No in S110), the process goes back to S109.

In S111, when the input event is an instruction to access a new URL (Yes in S110), the content acquiring unit 131 in the current playback environment 13 accesses the URL. In other words, the content acquiring unit 131 transmits, to the URL, an HTTP request indicating a request to acquire the HTML content. Here, the content acquiring unit 131 adds a recommend option to the URL.

The recommend option indicates the current playback environment 13. The recommend option is, for example, added to the URL to be accessed in the following format.

http//<access destination URL>?recommend=<playback environment information>

Here, <playback environment information> includes, for example, the kind of the OS in the current playback environment 13 and the kind of the rendering engine realizing the playback unit 132.

As described below, the recommend option is added in order to recommend the current playback environment 13 to the main environment 13a as the playback destination of the HTML content concerning the new URL.

Figure 6:
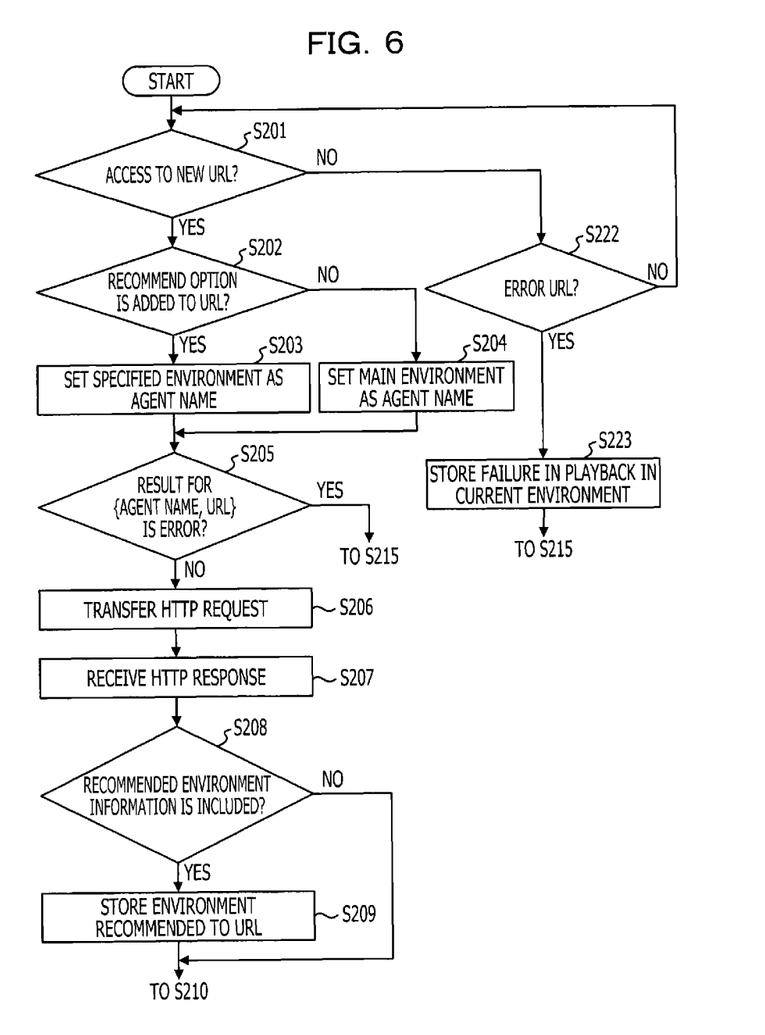
FIG. 6 is a flow chart illustrating an example of a procedure performed in a main environment.
Figure 7:
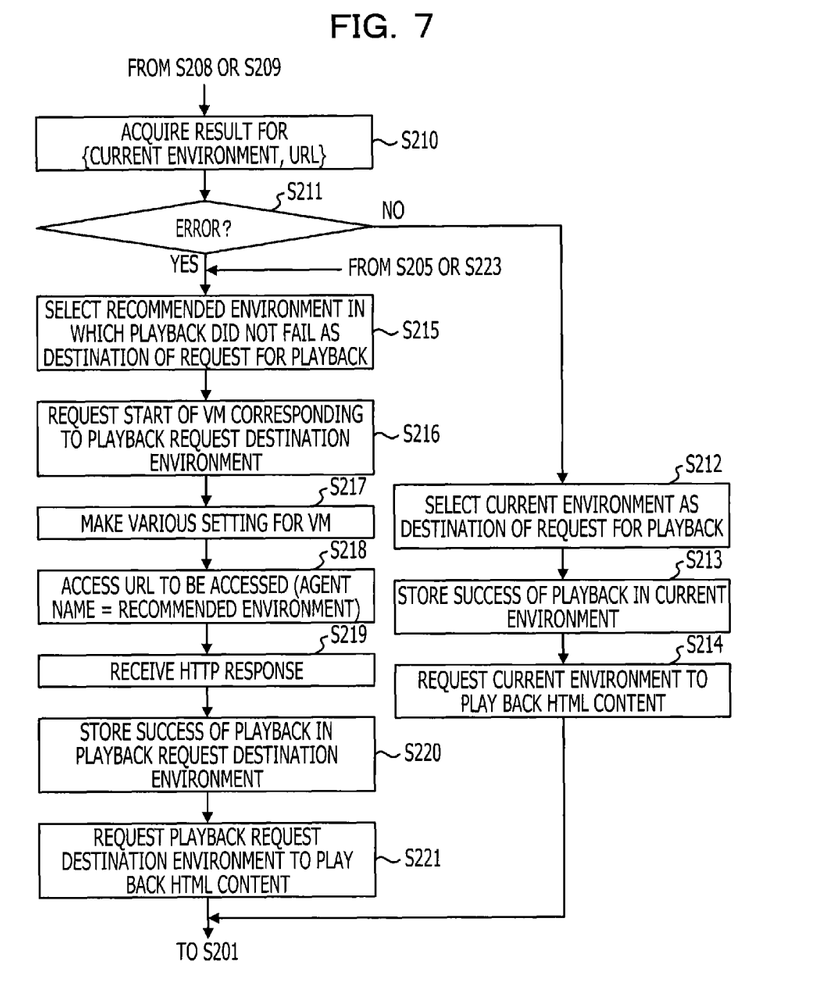
FIG. 7 is a flow chart illustrating the example of a procedure performed in a main environment.

A procedure performed in the main environment 13a will now be described. FIG. 6 and FIG. 7 are flow charts illustrating an example of a procedure performed in the main environment. In an initial state in FIG. 6 and FIG. 7, the browsing screen is displayed in the display unit 106 by the UI display unit 134.

In S201, the monitoring unit 135 in the main environment determines whether an access to a new URL is detected.

In S202, when an access to a new URL is detected (Yes in S201), the monitoring unit 135 in the main environment determines whether a recommend option is added to the URL. The access to a URL means transmission of an HTTP request indicating acquisition of the HTML content concerning the URL. The access to a new URL means an access to a first URL after the browsing screen is displayed or an access to a URL different from the URL that has been last accessed (that has been accessed most recently).

The access to a URL is performed by the content acquiring unit 131 in the current playback environment 13, as in S111 in FIG. 5. However, in the case of an access to a first URL after the browsing screen is displayed, that is, in a state in which no HTML content is displayed in the browsing screen, the access to a URL is performed by a content acquiring unit 131a in the main environment 13a. In this case, the main environment 13a corresponds to the current playback environment 13.

An access to a URL occurs, for example, in response to an input of the URL or selection of a bookmark on the browsing screen, selection of a link on an HTML content that is being displayed, etc. by a user.

In S203, when a recommend option is added to the URL to be accessed (Yes in S202), the content acquiring unit 131a in the main environment 13a sets the playback environment information specified in the recommend option as an identification name (hereinafter referred to as an "agent name") of a user agent in the HTTP request. An agent name is a parameter for notifying the content server 20 of the environment of a client that requests the HTML content and is specified after a prefix "User-Agent:" in an HTTP request.

In S204, when the recommend option is not added to the URL to be accessed (No in S202), the content acquiring unit 131a sets the playback environment information about the main environment 13a as the agent name. No addition of the recommend option to the URL to be accessed is exemplified by a case in which an access to the URL is performed in a state in which the HTML content is not displayed.

In S205, the content acquiring unit 131a determines whether playback of the HTML content concerning the URL to be accessed failed in the past in the playback environment 13 concerning the agent name identified in S203 or S204. The determination is performed by referring to the playback suitability information storage unit 138.

Figure 8:
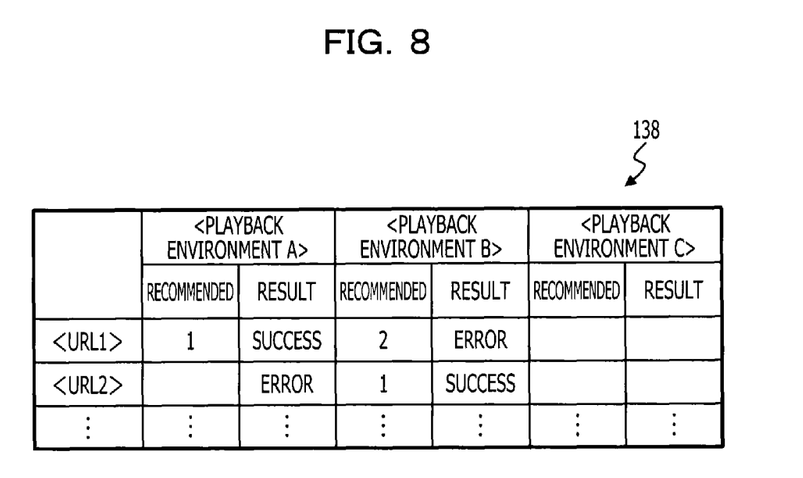
FIG. 8 illustrates an example of a structure of a playback suitability information storage unit.

FIG. 8 illustrates an example of a data structure of the playback suitability information storage unit. As illustrated in FIG. 8, the playback suitability information storage unit 138 stores, for each playback environment 13, values of items including "Recommended" and "Result" for respective URLs that have been accessed. The "Recommended" and the "Result" are examples of information indicating suitability for playback. Specifically, the "Recommended" is an item indicating whether the playback environment 13 is specified as a recommended environment in a response from the content server 20 in response to the HTTP request to the URL. When a priority order is set for each recommended environment, the priority order may be recorded in the "Recommended". When no priority order is set, for example, "1" may be recorded for the "Recommended" for the respective playback environments 13 listed as the recommended environments.

The "Result" is an item indicating whether the playback of the HTML content concerning the URL succeeded in the playback environment 13. "Success" indicates success and "Error" indicates failure.

The example in FIG. 8 indicates that <Playback environment A> for <URL1> is specified as a first recommended environment by the content server 20 and the playback succeeded. The example in FIG. 8 also indicates that <Playback environment B> for <URL1> is specified as a second recommended environment by the content server 20 but the playback failed. Thus, the specification as the recommended environment by the content server 20 does not ensure the success of playback in the recommended environment. This is because, even if the kind of the OS and the kind of the rendering engine are matched with the recommended environment, the success or failure of the playback of the HTML content may be varied depending on whether the plug-in is installed.

In the example in FIG. 8, the character strings enclosed by < > are practically replaced with specific values. For example, <Playback environment A>, <Playback environment B>, and <Playback environment C> are replaced with the identification information (for example, the character strings indicating the kind of the OS and the kind of the rendering engine) about the playback environment 13a, the playback environment 13b, and the playback environment 13c, respectively. <URL1> and <URL2> are replaced with the URLs that have been practically accessed.

In S205 in FIG. 6, it is determined whether the value of the "Result" is "Error" for the combination of the playback environment 13 matched with the agent name and the URL to be accessed.

In S206, when "Error" is not recorded in the "Result" for the combination of the URL to be accessed and the playback environment 13 concerning the agent name identified in S203 or S204 (No in S205), the content acquiring unit 131a transfers, to the content server 20, the HTTP request concerning the access to the URL. Here, the content acquiring unit 131a removes the recommend option added to the URL to be accessed. This is because the recommend option is information that may be interpreted by the content acquiring unit 131a and that is meaningless for the content server 20. Instead of the recommend option, the content acquiring unit 131a includes the agent name identified in S203 or S204 in the HTTP request.

The content server 20 receives the HTTP request and returns an HTTP response including an HTML content corresponding to the agent name specified in the HTTP request. However, the content server 20 does not necessarily have the HTML content corresponding to the agent name. For example, when the content server 20 includes only one HTML content for each URL, the content server 20 returns an HTTP response including one HTML content corresponding to the URL specified in the HTTP request, regardless of the agent name.

In S207, the content acquiring unit 131a receives the HTTP response returned from the content server 20.

In S208, the content acquiring unit 131a determines whether recommended environment information is included in the received HTTP response. The recommended environment information indicates a playback environment recommended for playback of the HTML content included in the HTTP response and is identified by the kind of the OS and the kind of the rendering engine in the present embodiment. For example, in the case of an HTML content for which the recommended environment information is set in advance in the content server 20, an HTTP response including the HTML content and the recommended environment information is returned. The recommended environment information may include the kinds of the OSs and the kinds of the rendering engines concerning multiple recommended environments. In this case, priority orders may be set to the respective recommended environments.

In S209, when the recommended environment information is included in the HTTP response (Yes in S208), the content acquiring unit 131a stores, in the playback suitability information storage unit 138, the recommendation of the playback environment 13 indicated by the recommended environment information for the URL to be accessed. Specifically, a row corresponding to the URL to be accessed and a column corresponding to the playback environment 13 concerning the recommended environment information are added to the playback suitability information storage unit 138. The priority order of the playback environment 13 specified in the recommended environment information, for example, is recorded for the "Recommended" in the row and the column.

When a row corresponding to the URL to be accessed exists in the playback suitability information storage unit 138, a new row is not added. Similarly, when a column corresponding to the playback environment 13 concerning the recommended environment information exists in the playback suitability information storage unit 138, a new column is not added.

When the recommended environment information is not included in the HTTP response (No in S208), the process skips S209.

In S210 in FIG. 7, the selecting unit 136 acquires the "Result" of the URL to be accessed in the current playback environment 13 from the playback suitability information storage unit 138.

In S211, it is determined whether the value of the "Result" is "Error".

In S212, when the value of the "Result" is not "Error" (No in S211), the selecting unit 136 selects the current playback environment 13 as the destination of a request to play back the new HTML content. Situations in which the value of the "Result" is not "Error" include a situation in which the "Result" is not stored in the playback suitability information storage unit 138. In other words, a situation is included in which playback of the HTML content concerning the URL to be accessed has not been performed in the current playback environment 13.

In S213, the playback requesting unit 137 stores the success of playback concerning the URL of the new HTML content in the current playback environment 13 in the playback suitability information storage unit 138. Specifically, a row corresponding to the URL to be accessed and a column corresponding to the current playback environment 13 are added to the playback suitability information storage unit 138. "Success" is recorded for the "Result" in the row and the column. When a row corresponding to the URL to be accessed exists in the playback suitability information storage unit 138, a new row is not added. Similarly, when a column corresponding to the current playback environment 13 exists in the playback suitability information storage unit 138, a new column is not added.

At the stage of S213, the success or failure in playback of the new HTML content in the current playback environment 13 is not determined. Accordingly, the success of playback concerning the URL in the playback environment 13 is temporarily stored in the playback suitability information storage unit 138 in S213. When a failure in playback is detected, "Error" is overwritten in the playback suitability information storage unit 138.

In S214, the playback requesting unit 137 inputs, in the VMM 11, a request for playback of the HTML content to the current playback environment 13. The HTML content is also transferred to the current playback environment 13 via the VMM 11 along with the request for playback. S102 in FIG. 5 is performed in response to this request for playback.

As described above, in the present embodiment, the current playback environment 13 is preferentially selected as the destination of the request to play back the HTML content that is newly received. The preferential selection of the current playback environment 13 is to avoid occurrence of the processing load caused by switching of the current playback environment 13 as much as possible. In other words, this is because the continuous playback in the same playback environment 13 seems to have a lower probability of stress given to the user. The processing load here means, for example, the load of the processing performed in S216 to S219 described below.

In S215, when the value of the "Result" of the current playback environment 13 is "Error" for the URL to be accessed (Yes in S211), the selecting unit 136 selects, as the destination of the request for playback concerning the URL to be accessed, a playback environment 13 which is a recommended environment and in which the playback did not fail. The playback environment 13 is identified by referring to the playback suitability information storage unit 138. Specifically, a playback environment 13 in which the priority order is recorded in the "Recommended" and the value of the "Result" is "Success" for the URL to be accessed is selected. The selected playback environment 13 is hereinafter referred to as a "playback request destination environment". For example, a playback environment 13 having a higher priority order recorded in the "Recommended" may be preferentially selected as the playback request destination environment. In contrast, when no playback environment 13 in which the priority order is recorded in the "Recommended" and the value of the "Result" is "Success" exists for the URL to be accessed, the current playback environment 13 or the main environment 13a, for example, may be selected as the playback request destination environment.

In S216, the playback requesting unit 137 requests the VMM 11 to start a VM 12 including the playback request destination environment. The VM 12 concerning the current playback environment 13 is set to the sleep state by the VMM 11 in response to the start of the VM 12 including the playback request destination environment. As a result, the playback request destination environment becomes a new current playback environment 13.

In S217, the playback requesting unit 137 makes various settings for the started VM 12 via the VMM 11. For example, the playback requesting unit 137 ensures a frame buffer Fb in the memory unit 103 and notifies the playback environment 13 on the started VM 12 of the address of the frame buffer Fb via the VMM 11. In addition, the playback requesting unit 137 notifies the playback environment 13 on the started VM 12 of the size of the playback area on the browsing screen via the VMM 11. Furthermore, the playback requesting unit 137 requests the VMM 11 to allocate the input event to the started VM 12. In other words, the VMM 11 is set so that the input event corresponding to an input operation for the HTML content that will be displayed is notified to the started VM 12.

In S218, the content acquiring unit 131a in the main environment 13a accesses the URL to be accessed. Specifically, the HTTP request is transmitted again to the same URL as that concerning the HTML content acquired in S207. However, the content acquiring unit 131a specifies the agent name concerning the playback request destination environment in the HTTP request. In other words, an agent name different from the one specified in the previous HTTP request is specified for the same URL.

In S219, an HTTP response is received. S218 and S219 are done in order to acquire an HTML content more suitable for the playback request destination environment in consideration of the probability of the content server 20 being configured so that the HTML content to be retuned is varied with the agent name.

Accordingly, when the content server 20 does not vary the HTML content to be returned in accordance with the agent name, S218 and S219 are not performed.

In S220, the playback requesting unit 137 temporarily stores, in the playback suitability information storage unit 138, the success of playback concerning the URL of the new HTML content in the playback request destination environment, as in S213.

In S221, the playback requesting unit 137 inputs, in the VMM 11, the request for playback of the HTML content to the playback request destination environment, which is included in the received HTTP response. The HTML content is also transferred to the playback request destination environment via the VMM 11 along with the request for playback. S102 in FIG. 5 is also performed in response to the request for playback.

The process goes back to S201 after S221 or S214.

A case in which the monitoring unit 135 detects an access to a URL other than a new URL in S201 will now be described.

In S222, when an access to a URL other than a new URL is detected (No in S201), the monitoring unit 135 determines whether the URL to be accessed is the error URL. An access to a URL other than a new URL means an access to an HTML content the URL of which is different from that of the HTML content that is being displayed. An access to the error URL is not an access to an HTML content. Accordingly, the access to the error URL is determined to be negative in S201.

In S223, when the URL to be accessed is the error URL (Yes in S222), the monitoring unit 135 stores, in the playback suitability information storage unit 138, data indicating the failure in playback of the HTML content concerning the URL to be accessed in the current playback environment 13. Specifically, "Success" temporarily recorded in S213 or S220 is replaced with "Error".

S215 and later in FIG. 7 are performed after S223. That is, when a problem occurs during the playback of the HTML content in the current playback environment 13, playback of the HTML content is attempted in another playback environment 13. In this case, before the HTML content is acquired in S218 and S219, the VM 12 including the playback request destination environment is started in S216. Accordingly, if the acquisition of the HTML content (S218 and S219) is performed in parallel to the start of the VM 12, it is possible to reduce the effect of the start-up time of the VM 12 on the time before the HTML content is played back.

Also when the determination in S205 is affirmative (Yes in S205), S215 and later in FIG. 7 are performed, without performing S206 to S210. The case in which the determination in S205 is affirmative (Yes in S205) corresponds to a case in which the playback of the HTML content concerning the URL to be accessed failed in the playback environment 13 concerning the agent name identified in S203 or S204. In other words, even when an HTML content is requested with an agent name concerning a playback environment 13 in which a failure in playback occurred being specified, the acquired HTML content is an HTML content determined to be suitable for the playback environment 13. Since the playback of the HTML content failed in the above playback environment 13, the above playback environment 13 is not selected as the destination of request for playback by the selecting unit 136 (refer to S210, S211, and S215). Accordingly, playback is requested to another playback environment 13 different from the above playback environment 13. Even when the HTML content is requested with the agent name concerning the playback environment 13 different from the other playback environment 13 being specified despite the fact that the playback is requested to the other playback environment 13, the acquired HTML content is not possibly suitable for the other playback environment 13. Consequently, when the determination in S205 is affirmative (Yes in S205), a playback environment 13 in which the playback succeeded in the past is selected as the destination of the request for playback and the HTTP request is transmitted with the agent name concerning the selected playback environment 13 being specified.

As described above, in the present embodiment, multiple playback environments 13 are prepared in advance and a playback environment 13 where playback is to be performed is selected on the basis of whether playback of the received HTML content is suitable. Accordingly, it is possible to increase the probability of being normally played back for even an HTML content that depends on a specific playback environment 13. As a result, it is possible to increase the probability of the content being played back without putting any stress on the user.

The result of success or failure in playback concerning the playback environment 13 where the playback is performed, the recommended environment information notified from the content server 20, etc. are stored in the playback suitability information storage unit 138 for each URL that is accessed. The suitability for playback is determined based on the information stored in the playback suitability information storage unit 138. Accordingly, it is possible to select a suitable playback environment 13 on the basis of, for example, the past result and/or the recommendation of the content server 20 as the playback destination.

When a problem occurs during the playback in the playback environment 13 selected as the playback destination, another playback environment 13 is selected and playback is performed in the selected playback environment 13. Accordingly, it is possible to increase the probability of the HTML content depending on the specific playback environment 13 being finally played back normally.

The playback suitability information storage unit 138 is an example of a storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A playback apparatus comprising:
    a storage unit to store therein, for each of a plurality of playback environments, information indicating playback suitability of a plurality of contents by each of the plurality of playback environments and an associated identifier of each content; and
    a processor to
        receive a content via a network,
        match the identifier of the received content to a corresponding identifier of one of the contents stored in the storage unit,
        select a playback environment from the plurality of playback environments by determining that playback of the received content by the selected playback environment previously succeeded as indicated by the information indicating playback suitability of the corresponding matched content by the selected playback environment stored in the storage unit,
        start a first virtual machine that includes the selected playback environment, the first virtual machine being one of a plurality of virtual machines each including a playback environment, the playback environments included in the plurality of virtual machines being different from one another, and
        request the first virtual machine to play back the received content.

2. The playback apparatus according to claim 1, wherein the processor requests a currently running virtual machine to play back the received content when information indicating playback suitability associated with the identifier of the received content is not stored in the storage unit for the playback environment included in the first virtual machine.

3. The playback apparatus according to claim 1, wherein the information indicating playback suitability stored in the storage unit comprises success or failure of the playback of each content of the plurality of contents by each playback environment.

4. The playback apparatus according to claim 1, wherein the processor further
    receives, along with the received content, information indicating a playback environment recommended for playback of the received content, and
    stores the received information in the storage unit and the identifier of the received content.

5. The playback apparatus according to claim 1, wherein the processor further starts a second virtual machine among the plurality of virtual machines and requests the second virtual machine to play back the received content when a problem occurs in the first virtual machine during the playback of the received content.

6. A playback method comprising:
    a storage unit to store therein, for each of a plurality of playback environments, information indicating playback suitability of a plurality of contents by each of the plurality of playback environments and an associated identifier of each content; and
    a processor to
        receive, by a computer, a content via a network;
        match the identifier of the received content to a corresponding identifier of one of the contents stored in the storage unit;
        select a playback environment from the plurality of playback environments by determining that playback of the received content by the selected playback environment previously succeeded as indicated by information indicating playback suitability of the corresponding matched content by the selected playback environment stored in the storage unit;
        start first virtual machine that includes the selected playback environment, the first virtual machine being one of a plurality of virtual machines each including a playback environment, the playback environments included in the plurality of virtual machines being different from one another; and
        request the first virtual machine to play back the received content.

7. The playback method according to claim 6, wherein the computer requests a currently running virtual machine to play back the received content when information indicating playback suitability associated with the identifier of the received content is not stored in the storage unit for the playback environment included in the first virtual machine.

8. The playback method according to claim 6, wherein information indicating playback suitability stored in the storage unit comprises success or failure of the playback of each content of the plurality of contents by each playback environment.

9. The playback method according to claim 6, further comprising:
    receiving, along with the received content, information indicating a playback environment recommended for playback of the received content; and
    storing the received information in the storage unit and the identifier of the received content.

10. The playback method according to claim 6, further comprising: starting a second virtual machine among the plurality of virtual machines and requesting the second virtual machine to play back the received content when a problem occurs in the first virtual machine during the playback of the received content.

11. A non-transitory computer-readable recording medium that stores a program causing a computer to execute a procedure comprising:
- storing for each of a plurality of playback environments, information indicating playback suitability of a plurality of contents by each of the plurality of playback environments and an associated identifier of each content to a storage unit; and
- receiving a content via a network;
- selecting a playback environment from the plurality of playback environments by determining that playback of the received content by the selected playback environment previously succeeded as indicated by information indicating playback suitability of the corresponding matched content by the selected playback environment stored in the storage unit;
- starting a first virtual machine including the selected playback environment, the first virtual machine being one of a plurality of virtual machines each including a playback environment, the playback environments included in the plurality of virtual machines being different from one another; and
- requesting the first virtual machine to play back the received content.

12. The non-transitory computer-readable recording medium according to claim 11, wherein the computer requests a currently running virtual machine to play back the received content when information indicating playback suitability associated with the identifier of the received content is not stored in the storage unit for the playback environment included in the first virtual machine.

13. The non-transitory computer-readable recording medium according to claim 11, wherein information indicating playback suitability stored in the storage unit comprises success or failure of the playback of each content of the plurality of contents by each playback environment.

14. The non-transitory computer-readable recording medium according to claim 11, the procedure further comprising:
- receiving, along with the received content, information indicating a playback environment recommended for playback of the received content; and
- storing the received information in the storage unit and the identifier of the received content.

15. The non-transitory computer-readable recording medium according to claim 11, the procedure further comprising:
- starting a second virtual machine among the plurality of virtual machines and requesting the second virtual machine to play back the received content when a problem occurs in the first virtual machine during the playback of the received content.

* * * * *

UNITED STATES PATENT AND TRADEMARK OFFICE
CERTIFICATE OF CORRECTION

| | | |
|---|---|---|
| PATENT NO. | : 9,058,405 B2 | Page 1 of 1 |
| APPLICATION NO. | : 13/652744 | |
| DATED | : June 16, 2015 | |
| INVENTOR(S) | : Koichi Yasaki et al. | |

It is certified that error appears in the above-identified patent and that said Letters Patent is hereby corrected as shown below:

In the Claims

Column 14, Line 42:

In Claim 6, after "start" insert --a--.

Signed and Sealed this
Fifteenth Day of September, 2015

Michelle K. Lee
*Director of the United States Patent and Trademark Office*